US009727778B2

(12) United States Patent
Madhusudhanan et al.

(10) Patent No.: US 9,727,778 B2
(45) Date of Patent: Aug. 8, 2017

(54) SYSTEM AND METHOD FOR GUIDED CONTINUOUS BODY TRACKING FOR COMPLEX INTERACTION

(71) Applicant: Wipro Limited, Bangalore (IN)

(72) Inventors: Manoj Madhusudhanan, Bangalore (IN); Amit Kumar, Patna (IN); Sheeba Raj, Bangalore (IN)

(73) Assignee: Wipro Limited, Bangalore (IN)

( * ) Notice: Subject to any disclaimer, the term of this patent is extended or adjusted under 35 U.S.C. 154(b) by 472 days.

(21) Appl. No.: 14/275,492

(22) Filed: May 12, 2014

(65) Prior Publication Data

US 2015/0278586 A1 Oct. 1, 2015

(30) Foreign Application Priority Data

Mar. 28, 2014 (IN) .......................... 1687/CHE/2014

(51) Int. Cl.
*G06K 9/00* (2006.01)
*G06K 9/20* (2006.01)
(Continued)

(52) U.S. Cl.
CPC ........ *G06K 9/00342* (2013.01); *A63F 13/213* (2014.09); *A63F 13/42* (2014.09);
(Continued)

(58) Field of Classification Search
None
See application file for complete search history.

(56) References Cited

U.S. PATENT DOCUMENTS 4,645,458 A * 2/1987 Williams ........... A63B 69/0053
273/446
4,711,543 A * 12/1987 Blair ................ A63F 13/06
345/156
(Continued)

FOREIGN PATENT DOCUMENTS

CN 102727362 A 10/2012
CN 102867111 A 1/2013
(Continued)

*Primary Examiner* — Nancy Bitar
(74) *Attorney, Agent, or Firm* — LeClairRyan, a Professional Corporation (57) ABSTRACT

A method, non-transitory computer readable medium and apparatus that provides feedback to a user for interacting continuously without any disconnect. It gives real time visual clues and gestures based on application need. This solves the problem of a disconnected user found in current system and applications as user will be continuously aware whether and how much he is being tracked by the application that will allow him to continuously interact with the application. The requirements from various applications like FBT (Full body Tracking), HBT (Half Body Tracking), LTO (Leg Tracking Only), HTO (Hand Tracking Only), STO (Specific Tracking only) is sent to the CFBTE (Continuous Full Body Tracking Engine). The CFBTE process the requirements and generates the visual clues and gesture events. In visual clues the tracking level/intensity is continuously displayed, which will guide the user on system readiness and effectiveness for interaction.

23 Claims, 6 Drawing Sheets

(51) Int. Cl.
*A63F 13/213* (2014.01)
*A63F 13/42* (2014.01)
*G06T 7/246* (2017.01)

(52) U.S. Cl.
CPC ............ *G06K 9/2054* (2013.01); *G06T 7/251* (2017.01); *A63F 2300/6607* (2013.01); *G06T 2207/10021* (2013.01); *G06T 2207/10028* (2013.01); *G06T 2207/10048* (2013.01); *G06T 2207/30196* (2013.01)

(56) References Cited

U.S. PATENT DOCUMENTS

| | | | | |
|---|---|---|---|---|
| 7,072,494 | B2* | 7/2006 | Georgescu | G06K 9/3216 382/103 |
| 7,340,077 | B2* | 3/2008 | Gokturk | G06F 3/017 348/208.14 |
| 9,342,146 | B2* | 5/2016 | Bychkov | G06F 3/013 |
| 2010/0281432 | A1* | 11/2010 | Geisner | G06F 3/011 715/849 |
| 2010/0281437 | A1* | 11/2010 | Stone-Perez | G06F 3/011 715/863 |
| 2010/0295782 | A1* | 11/2010 | Binder | G01S 3/7864 345/158 |
| 2011/0193939 | A1* | 8/2011 | Vassigh | G06F 3/011 348/46 |
| 2012/0182392 | A1* | 7/2012 | Kearns | B25J 11/009 348/46 |
| 2013/0335318 | A1 | 12/2013 | Nagel et al. | |
| 2014/0044309 | A1 | 2/2014 | Leyvand et al. | |
| 2015/0278586 | A1* | 10/2015 | Madhusudhanan | G06K 9/2054 382/103 |

FOREIGN PATENT DOCUMENTS

| | | |
|---|---|---|
| CN | 102867112 A | 1/2013 |
| CN | 103150559 A | 6/2013 |

* cited by examiner

HTO - Hand Tracking Only
LTO - Leg Tracking Only
HBT - Half Body Tracking
FBT - Full Body Tracking

FIG. 5: Example Computer System

SYSTEM AND METHOD FOR GUIDED CONTINUOUS BODY TRACKING FOR COMPLEX INTERACTION

This application claims the benefit of Indian Patent Application No. 1687/CHE/2014 filed Mar. 28, 2014, which is hereby incorporated by reference in its entirety.

FIELD OF INVENTION

This example of the technology relates generally to body tracking, and more particularly to system and method for guided continuous body tracking for complex interaction.

BACKGROUND

In the past, computing applications such as computer games and multimedia applications used controllers, remotes, keyboards, mouse, or the like to allow users to manipulate game characters or other aspects of an application. More recently, computer games and multimedia applications have begun employing cameras and software gesture recognition to provide a human computer interface ("HCI"). With HCI, user gestures are detected, interpreted and used to control game characters or other aspects of an application.

Gesture based applications are fast catching up with all industry applications with a motto of removing man machine barrier. Today, most of the applications use gestures as a replacement to mouse/touch interface by mapping cursor to gestures. New applications/concepts like virtual environments are emerging that need to extend simple gestures based interaction to capture complex using continuous body tracking Some of the gesture detection devices (Kinect) allow body tracking using combinations of normal camera, IR (infrared) camera etc.

Applications that need continuous body detection for interaction need to be deployed carefully keeping field of focus, lighting, distance for interaction, multiple users etc. so that the application/system (user and application) can work effectively. However, the user while interacting (which requires movement to different positions) may lose the body tracking (BT) and continue to interact with applications assuming continuous BT leading to loss of functionalities. Mechanism for continuous body tracking is there but continues feedback for the level of tracking to the user is not available as of now.

In the light of the above drawbacks, it would be desirable to have a mechanism for continuous body tracking of the application to give user feedback and guidance on system readiness and effectiveness for interaction without any system/application training and no specified manual alignment of distance, lighting, etc.

SUMMARY

A method for continuous tracking of body of at least one user includes: capturing tracking points on body of the at least one user with a capture system; listening continuously to at least one application to receive data related to one or more gestures required by the at least one application and body tracking points associated with the one or more gestures; filtering the tracking points on the body based on the body tracking points associated with the one or more gestures; monitoring continuously variation of intensity of the filtered one or more tracking points, variation of the intensity being associated with tracking of the filtered one or more tracking points; and generating an audiovisual feedback in real time for the at least one user if variation of the intensity fails to meet a predetermined body tracking criterion, the predetermined body tracking criterion based on tracking of the filtered one or more tracking points, wherein at least one of the capturing, listening, filtering, monitoring, and generating is performed by one or more hardware processors.

In another aspect of the invention, an apparatus that continuously tracks a body of at least one user is disclosed. The apparatus includes a capture system to capture tracking points on body of the at least one user; one or more hardware processors; and a computer-readable medium. The computer-readable medium stores instructions that, when executed by the one or more hardware processors, cause the one or more hardware processors to perform operations comprising: listening continuously to at least one application to receive data related to one or more gestures required by the at least one application; body tracking points associated with the one or more gestures; filtering the tracking points on the body based on the body tracking points associated with the one or more gestures; and monitoring continuously variation of intensity of the filtered one or more tracking points, variation of the intensity being associated with tracking of the filtered one or more tracking points; and generating an audiovisual feedback in real time for the at least one user if variation of the intensity fails to meet a predetermined body tracking criterion, the predetermined body tracking criterion based on tracking of the filtered one or more tracking points.

In yet another aspect of the invention, a non-transitory computer-readable medium storing instructions for continuous tracking of body of at least one user that, when executed by one or more hardware processors, cause the one or more hardware processors to perform operations is disclosed. The operations include listening continuously to at least one application to receive data related to one or more gestures required by the at least one application and body tracking points associated with the one or more gestures; filtering the tracking points on the body based on the body tracking points associated with the one or more gestures; monitoring continuously variation of intensity of the filtered one or more tracking points, variation of the intensity being associated with tracking of the filtered one or more tracking points; and generating an audiovisual feedback in real time for the at least one user if variation of intensity fails to meet a predetermined body tracking criterion, the predetermined body tracking criterion based on tracking of the filtered one or more tracking points.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the drawings.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
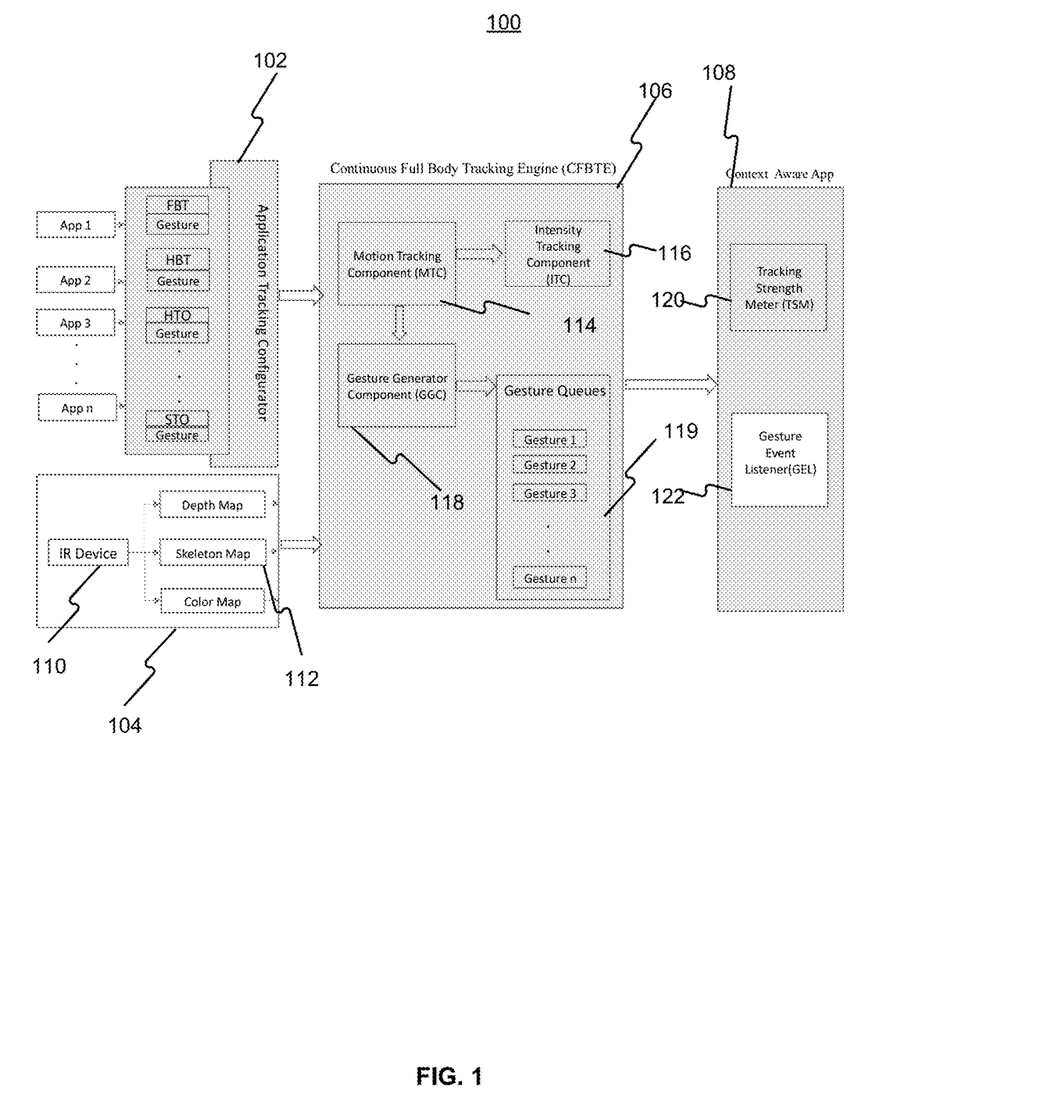
FIG. 1 is a block diagram of a high-level architecture of an exemplary tracking system 100 for continuous tracking of body of a user in accordance with some embodiments of the present disclosure.

FIG. 1 is a block diagram of a high-level architecture of an exemplary tracking system 100 for continuous tracking of body of a user 101 in accordance with some embodiments of this example of the technology comprising a plurality of applications (App1 ... App n) like yoga application, boxing application, an application traffic configurator 102, a capture system 104, a continuous full body tracking engine 106 (CFBTE), and a context aware application 108.

The tracking system 100 may be used to recognize, analyze and track a human target such as the user 101. The user 101 may interact with a user-interface of the tracking system 100. The tracking system 100 may include a computing environment (not shown). The computing environment may be a computer, a gaming system or console, or the like. According to one embodiment, the computing environment may include hardware components and/or software components such that the computing environment may be used to execute an operating system and applications such as gaming applications, non-gaming applications, or the like. In one embodiment, computing system may include a processor such as a standardized processor, a specialized processor, a microprocessor, or the like that may execute instructions stored on a processor readable storage device for performing the processes described herein.

As shown in FIG. 1, the tracking system 100 may include the capture system 104. The capture system 104 may be, for example, an infrared (IR) camera that may be used to visually monitor one or more users, such as the user 101 (shown in FIG. 2), such that gestures performed by the one or more users may be captured, analyzed, and tracked to perform one or more controls or actions for the user-interface of an operating system or application.

In another embodiment, the tracking system 100 may be connected to an audiovisual device (not shown) such as a television, a monitor, a high-definition television (HDTV), or the like that may provide game or application visuals and/or audio to a user such as the user 101. For example, the computing environment may include a video adapter such as a graphics card and/or an audio adapter such as a sound card that may provide audiovisual signals associated with the game application, non-game application, or the like. The audiovisual device may receive the audiovisual signals from the computing environment and may output the game or application visuals and/or audio associated with the audiovisual signals to the user 101. According to one embodiment, the audiovisual device may be connected to the computing environment via, for example, an S-Video cable, a coaxial cable, an HDMI cable, a DVI cable, a VGA cable, or the like.

The tracking system 100 may include gesture recognition, so that the user 101 may control an application or operating system executing on the computing environment, which as discussed above may be a game console, a computer, or the like, by performing one or more gestures. In one embodiment, a skeletal map of the user 101 may be used to determine when a particular gesture has been made by the user 101.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms in front of his torso. A gesture may comprise more than one body part, such as clapping the hands together.

For instance, various motions of the hands or other body parts may correspond to common system wide tasks such as to navigate up or down in a hierarchical menu structure, scroll items in a menu list, open a file, close a file, and save a file. Gestures may also be used in a video-game-specific context, depending on the game. For instance, with a driving game, various motions of the hands and feet may correspond to steering a vehicle in a direction, shifting gears, accelerating, and braking.

As shown in FIG. 1, each of the plurality of applications may specify a certain gesture and body tracking requirements associated with each of the gestures (Full body tracking only FBT, half body tracking HBT). The capture system 104 may comprise an IR device 110 that provides a color map, a depth map, and a skeleton map 112. The skeleton map 112 may capture three dimensional tracking points on body of the user 101.

In one embodiment, the capture system 104 may be used in the target recognition, analysis and tracking to recognize human and non-human targets in a capture area (without special sensing devices attached to the subjects), uniquely identify them and track them in three dimensional space. According to one embodiment, the capture system 104 may be configured to capture video with depth map including a depth image that may include depth values via any suitable technique including, for example, time-of-flight, structured light, stereo image, or the like.

Figure 2:
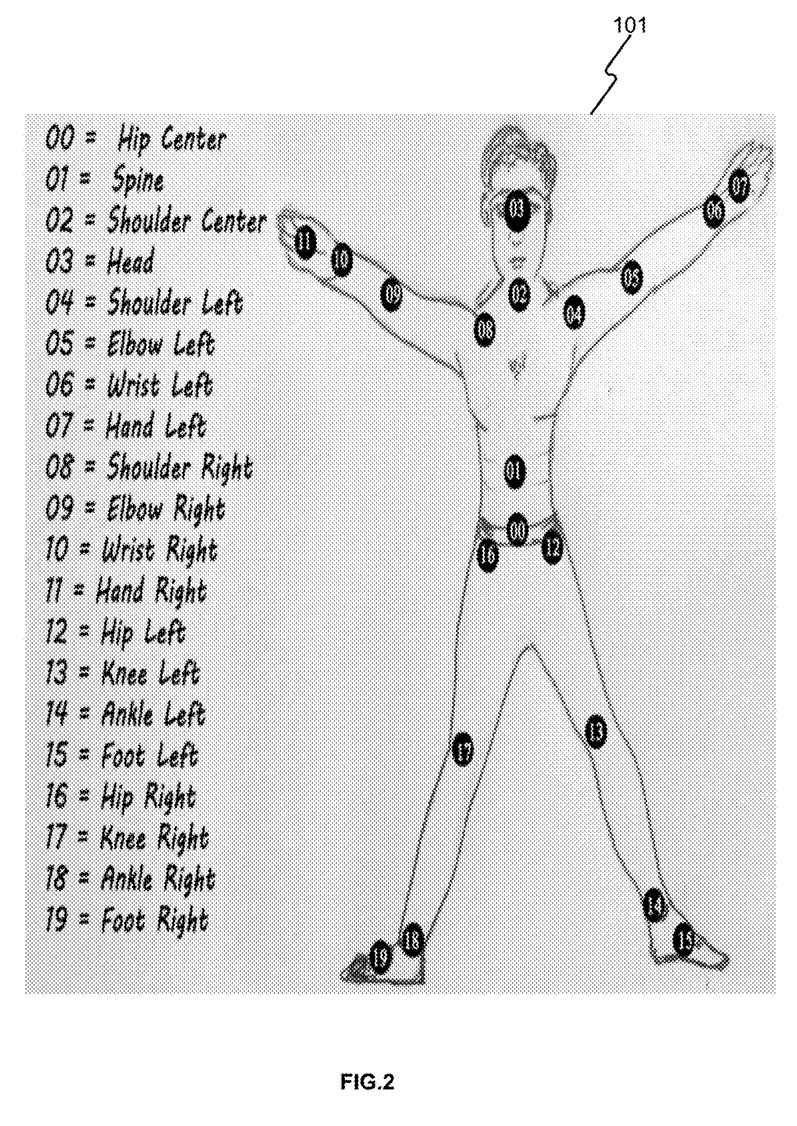
FIG. 2 is a diagram of examples of tracking points on body of the user in accordance with some embodiments.

The tracking points on the body of the user 101 are illustrated in FIG. 2. Further it has been illustrated that how the movements of some of the tracking points in a particular fashion is identified as a gesture. FIG. 2 illustrates a plurality of tracking points of various parts of the body of the user 101. The tracking points may be positioned on head, shoulder left, elbow left, wrist left, hip left, knee left, ankle left etc. It can be clearly seen that movement of the tracking points on the body in a particular fashion or direction may constitute a gesture like push, wave, kick, and jump. In one embodiment of the invention, the tracking points to track whole of the body may be 20.

Figure 3A:
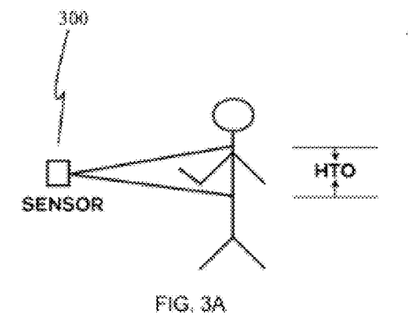
FIGS. 3A-3D are diagrams of tracking of various parts of the body and associated gestures in accordance with some embodiments of the present disclosure.
Figure 3B:
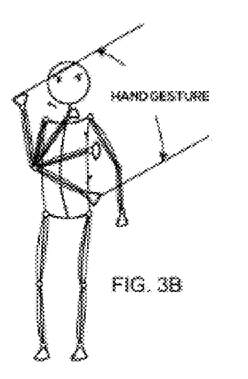
Figure 3C:
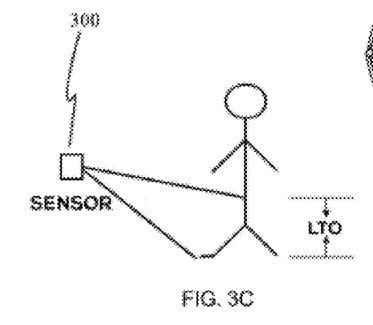
Figure 3D:
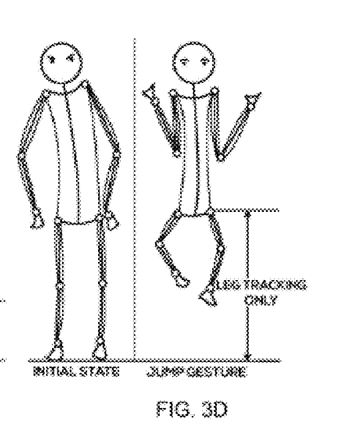

As shown in FIG. 3A, sensor 300 tracks only the hand of the user 101. The sensor 300 may be the IR device 110. FIG. 3B, change in positions of the tracking points of the hand constitute a hand gesture. In FIG. 3C, leg of the user 101 is being tracked. In FIG. 3D, change in position of the tracking points of the leg constitute a jump gesture.

The continuous full body tracking engine 106 may comprise motion tracking component 114 (MTC), intensity tracking component 116 (ITC), gesture generator component 118, and at least one gesture queue 119 to store a plurality of gestures (gesture 1, gesture 2, gesture 3) Each of the MTC 114, ITC 116, GGC 118 may be a software, hardware, or a combination of hardware and software.

The context aware application 108 may comprise tracking strength meter 120 (TSM) and a gesture event listener 122 (GEG). The architecture shown in FIG. 1 may be implemented using the capture system 104, one or more hardware processors (not shown), and a computer-readable medium storing instructions (not shown) configuring the one or more hardware processors. The one or more hardware processors and the computer-readable medium may also form part of the tracking system 100.

Figure 4A:
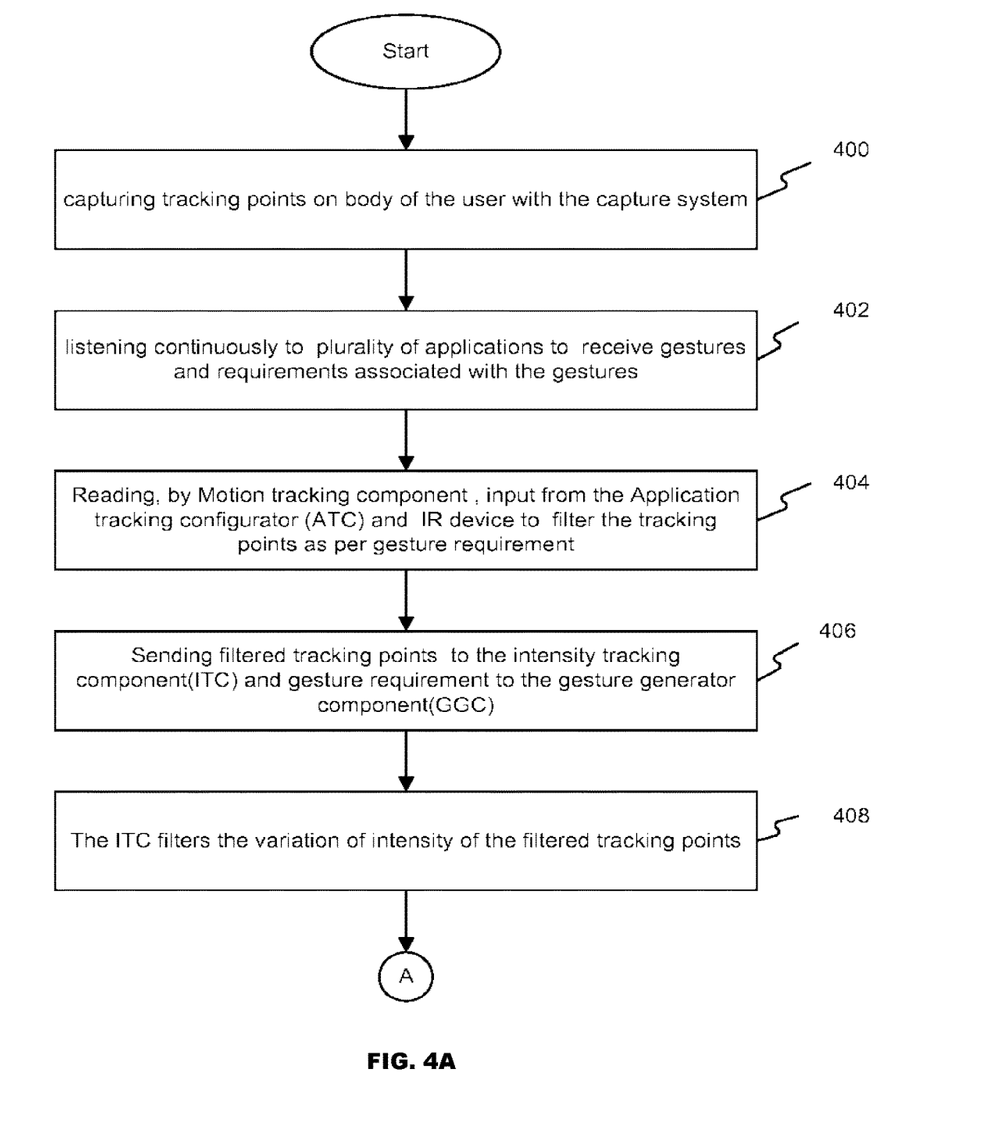
FIG. 4A-4B are flowcharts of a method of continuous tracking of body of the user in accordance with some embodiments of the present disclosure.
Figure 4B:
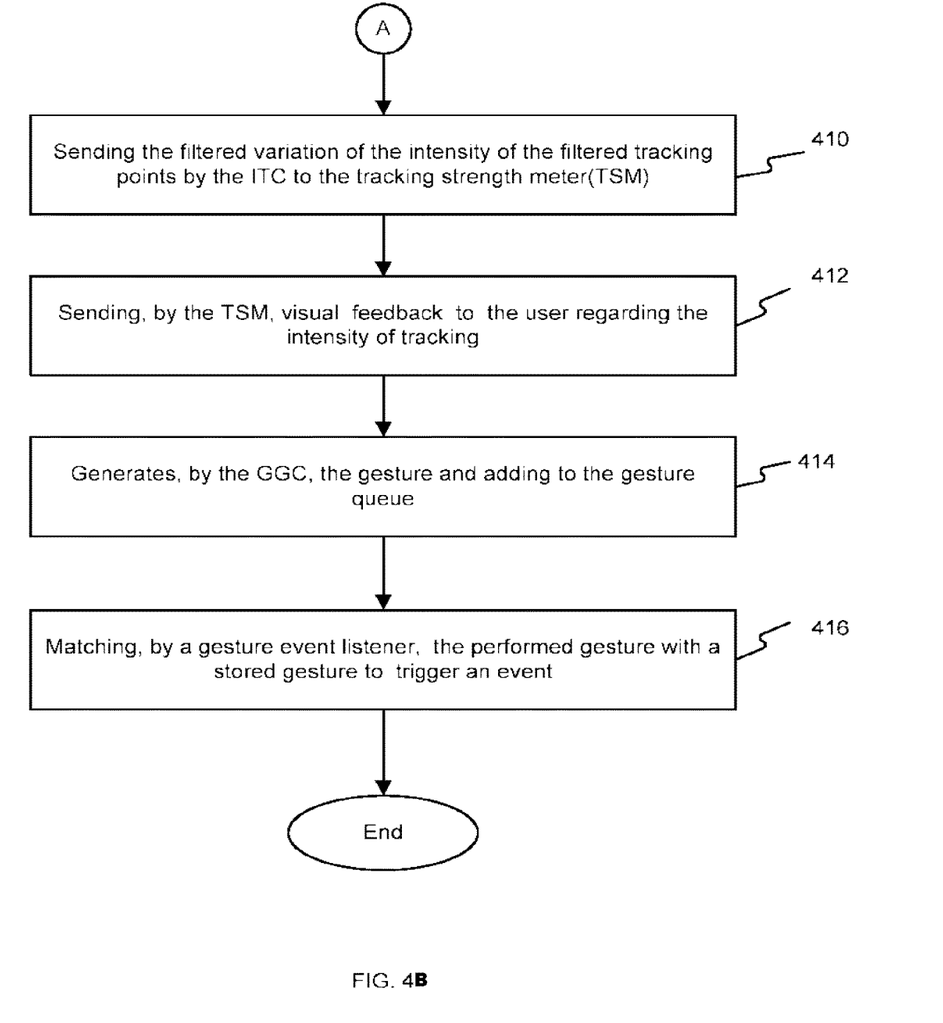

FIGS. 4A-4B are flowcharts illustrating an exemplary method of continuous tracking of body of the user 101 in accordance with some embodiments of this example of the technology. As shown in FIGS. 4A-4B, an example of a method in accordance with this example of the technology may include capturing tracking points on body of the user with the capture system 104 (Step 400). As explained earlier, the capture system 104 may track the whole body of the user 101. Whole body of the user 101 may include tracking points on the body of the user 101. These tracking points help in distinguishing between the user 101 and an animal. If an animal is within the view of the IR device 110 that tracks the tracking points on the body of the user 101, the animal would not be tracked as a human being At step 402, a method in accordance with this example of the technology may include listening continuously to the plurality of applications (App1, App2 . . . App n) by the application tracking configurator 102. The application tracking configurator 102 may receive run time requirement of each of the plurality of applications. The requirement of each of the plurality of applications may comprise gestures and body tracking requirements associated with each of the gestures like full body tracking FBT, half body tracking HBT.

At step 404, the CFBTE 106 reads input from the application tracking configurator (ATC) 102 and the IR device 110. The IR device 110 gives input data like the color map, skeleton map and depth map and sends information to the motion tracking component 114. The motion tracking component 114 receives all the tracking points of the user 101 in the form of skeleton map as shown in FIG. 2. The CFBTE 106 identifies closest person if multiple persons are identified. The motion tracking component 114 also receives gestures and body tracking requirements associated with each of the gestures. The gestures and body tracking requirements pertain to the runtime requirement of each of the applications. Accordingly, the MTC 114 acts as a first level filter and filters only those tracking points that satisfies the runtime requirement of the application for example, App 1. These filtered tracking points are sent to both the ITC 116 and GGC 118 (step 406).

At step 408, the ITC 116 filters the variation of intensity of the filtered tracking points. The intensity of the filtered tracking points pertains to the how much the user 101 is being tracked. Intensity is the strength or level of tracking. It is a state of points tracked on the body (fully tracked, tracked but not consistent, not tracked etc. Intensity of the tracked points is also affected by the environmental conditions like sunlight, lighting, distance, clothing, temperature etc. For example, it there is a yoga application that requires number of gestures to be performed. The number of tracking points required to track the gestures may be sent to the ITC 116. This ITC 116 then sends the filtered variation of the intensity of the filtered tracking points to the TSM 120 (step 410). Based on the intensity of the filtered tracking points, the TSM 120 provides a feedback to the user 101 (step 412). The feedback may be in the form of the visual clue as to how much body of the user is being tracked. Visual clue may be in the form of a human body silhouette. Visual clue may be displayed on the application. Depending on how much fraction of the body of the user 101 is being tracked, the user 101 is asked to adjust his position so that he is properly tracked. Also, the feedback may be in the form of an audio. There is a predetermined body tracking criterion which has to be met. In other words, the user 101 has to adjust his position to meet the predetermined tracking criterion. The predetermined tracking criterion is based on the tracking of the required body tracking points as per the gesture requirement. If the body of the user 101 is properly tracked as per the gesture requirement, the TSM 122 will indicate full intensity, else it gives an indication to the user 101 to adjust his position so that the required level of tracking intensity is achieved by the tracking system 100. The indication may be given using the application.

It is pertinent to note that the adjusting of the user 101 so that he is being properly tracked is performed before any gesture is being performed by the user 101. This is a continuous process. Gesture requirements of the application may keep coming and tracking as per the requirements of the gesture is performed continuously. The user 101 is monitored continuously so that the user 101 can interact with the gesture based application without any disconnect.

It is a two way flow. The MTC 114 sends all the tracking points to be tracked to the ITC 116 and specific gesture requirement to the GGC 118. At step 414, the GGC 118 generates the gesture and adds to the gesture queue 119. There are predefined gesture libraries available in the market but they are very limited like push, wave etc. But in current scenario we cannot be limited to few gestures. Any activity of the user 101 in front of IR device 110 can be mapped to a specific gesture. The gesture generator Component (GGC) 118 takes runtime requirement from the application. It defines the gesture and sends to the gesture queue 119. At same time MTC 114 keeps track of body points required to perform the gesture and sends the body points to ITC 116 and gesture requirements to the GGC 118. The GGC 118 defines the gestures and store gestures in the gesture queue 119 with gesture name. The gesture queue 119 maintains the sequence of the gestures and sends to the Gesture Event Listener (GEL) 122 where the application may guide the user 101 to perform the gestures like jump, walk, swipe as per application requirement. The gesture queue 119 may store all the required gesture and sends to the gesture event listener 122. For example, an application needs 5 gestures, all the required gestures may be stored in a sequence. According to action of the user 101 after the user 101 is being tracked properly (tracked at full intensity), the gesture event listener 122 may identify the gesture from stored gesture from the gesture queue 119 and triggers event specific to the gesture (step 416).

As for example let's assume that application needs to perform jump Gesture at a point of time. The MTC 114 knows that jump gesture is required, for jump gesture it needs the down half of the human body, It sends the gesture requirement to the GGC 118. The GGC 118 calculates the change in position of the required point with respect to time and adds the gesture to the Gesture Queue 119. The GEL 122 identifies the jump gesture of the user and matches with the jump gesture in the gesture queue 119 and triggers the event specific to the gesture. Suppose it is a kick gesture, the ball would move in the application. Moving of the ball is an event. Event is the response of the system to the gesture. In another example, the user 101 performs a right-handed horizontal fling gesture to scroll list of menu items to the left as seen from the user's point of view. The user 101 may use movements to end, pause, or save a game, select a level, view high scores, communicate with a friend, etc.

The IR device 110 may only give the 3d points on body of the user 101. Gesture can be decided or defined according to position movement, like if you are tracked, the camera will fix 20 points on your body. Now if you jump, your position will change and there would be consequent change in the tracking points. If that change in the tracking points is identified, we can say jump gesture is performed. The GEL 118 will compare the gesture with the stored gesture in the queue and an event specific to the matched gesture will be performed.

Figure 5:
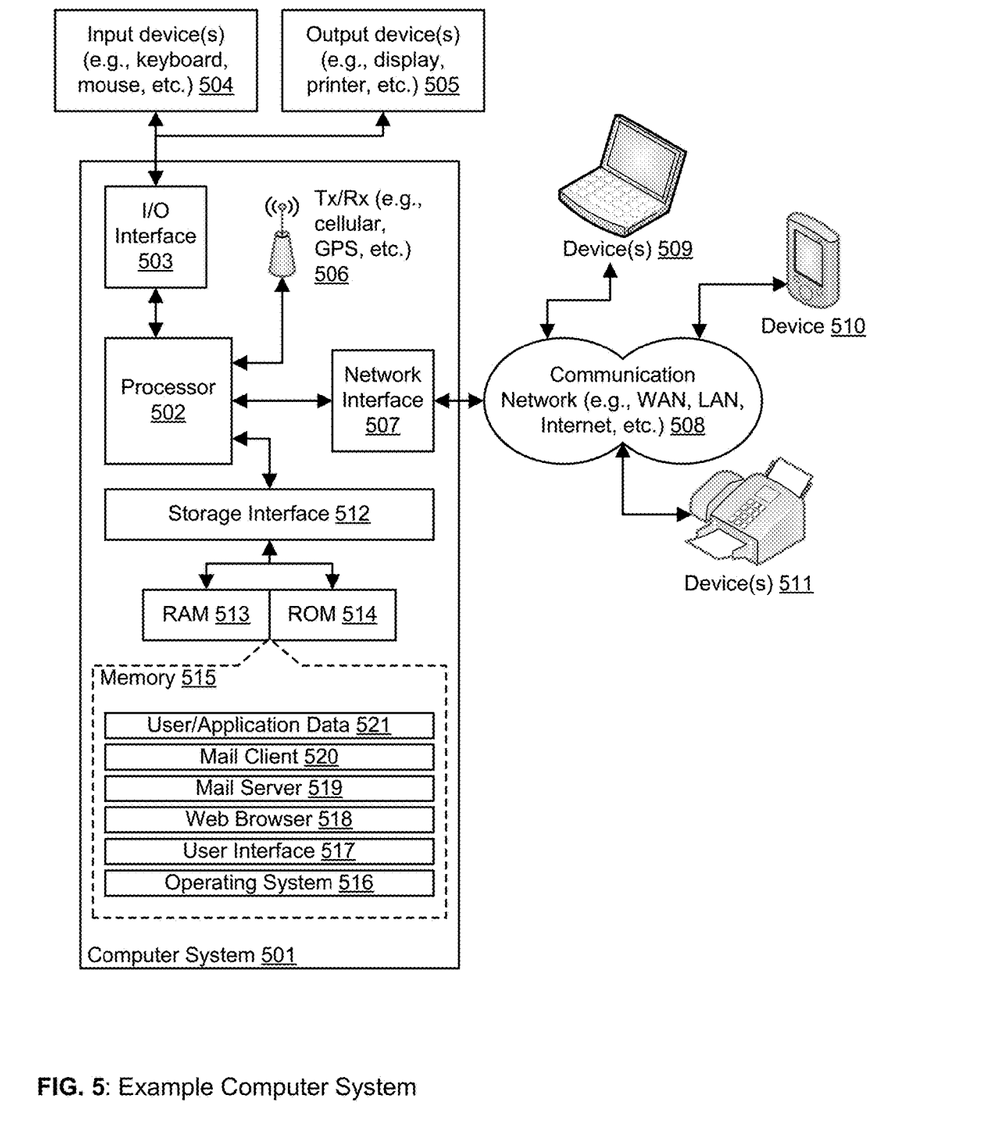
FIG. 5 is a block diagram of an exemplary computer system for implementing embodiments consistent with the present disclosure.

FIG. 5 is a block diagram of an example of a tracking management computing apparatus 501 for implementing embodiments consistent with this example of the technology, although other types of computer systems could be used. Variations of the tracking management computing apparatus 501 also referred to as the computer system 501 may be used for implementing any of the devices presented in this disclosure. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ devices via I/O interface 503. The I/O interface 503 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 505 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 515, user interface application 517, web browser 518, mail server 519, mail client 520, user/application data 521 (e.g., any data variables or data records discussed in this disclosure), etc. The operating system 515 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological developments will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with this example of the technology. A computer-readable storage medium refers to any type of physical memory on which information or data readable by a processor may be stored. Thus, a computer-readable storage medium may store instructions for execution by one or more processors, including instructions for causing the processor(s) to perform steps or stages as illustrated by way of the examples herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for continuous tracking of body of at least one user, the method comprising:
    capturing, by a tracking management computing apparatus, tracking points on body of the at least one user with a capture system;
    listening, by the tracking management computing apparatus, continuously to at least one application to receive data related to one or more gestures required by the at least one application and body tracking points associated with the one or more gestures;
    filtering, by the tracking management computing apparatus, the tracking points on the body based on the body tracking points associated with the one or more gestures;
    monitoring, by the tracking management computing apparatus, continuously a variation of intensity of the filtered one or more tracking points, the variation of the intensity being associated with tracking of each of the filtered one or more tracking points;
    generating, by the tracking management computing apparatus, an audiovisual feedback in real time for the at least one user when the variation of the intensity fails to meet a predetermined body tracking criterion, the predetermined body tracking criterion based on tracking of the filtered one or more tracking points, wherein at least one of the capturing, the listening, the filtering, the monitoring, or the generating is performed by one or more hardware processors; and
    confirming, by the tracking management computing apparatus, the variation of the intensity associated with tracking of each of the filtered one or more tracking points are above a threshold before any tracking of the one or more gestures required by the at least one application.

2. The method of claim 1, wherein the generating an audiovisual feedback comprises generating, by the tracking management computing apparatus, a human silhouette of the at least one user.

3. The method of claim 2, further comprising adjusting position by the at least one user to meet the predetermined tracking criterion in response to the audiovisual feedback to the at least one user.

4. The method of claim 1, wherein the capture system comprises an infrared (IR) device.

5. The method of claim 4, wherein the IR device captures a color map, depth map, and a skeleton map.

6. The method of claim 1, wherein the method further comprises sending, by the tracking management computing apparatus, the filtered tracking points associated with the one or more gestures to a gesture generator component.

7. The method of claim 6, wherein the method further comprises generating, by the gesture generator component, the one or more gestures based on the filtered tracking points.

8. The method of claim 7, wherein the method further comprises storing the generated one or more gestures in a sequence in a gesture queue, the sequence based on the requirement of the at least one application.

9. The method of claim 1, further comprising identifying, by the tracking management computing apparatus, action of the at least one user by the gesture event listener.

10. The method of claim 1, further comprising matching, by the tracking management computing apparatus, action of the at least one user with the stored one or more gestures to trigger at least one event specific to matched gesture.

11. A tracking management computing apparatus comprising:
a capture system to capture tracking points on body of the at least one user;
one or more hardware processors; and
a memory storing instructions that, when executed by the one or more hardware processors, cause the one or more hardware processors to perform operations comprising:
listening continuously to at least one application to receive data related to one or more gestures required by the at least one application and body tracking points associated with the one or more gestures;
filtering the tracking points on the body based on the body tracking points associated with the one or more gestures;
monitoring continuously a variation of intensity of the filtered one or more tracking points, the variation of the intensity being associated with tracking of each of the filtered one or more tracking points;
generating an audiovisual feedback in real time for the at least one user when the variation of the intensity fails to meet a predetermined body tracking criterion, the predetermined body tracking criterion based on tracking of the filtered one or more tracking points; and
confirming the variation of the intensity associated with tracking of each of the filtered one or more tracking points are above a threshold before any tracking of the one or more gestures required by the at least one application.

12. The apparatus of claim 11, wherein generating the audiovisual feedback comprises generating a human silhouette of the at least one user.

13. The apparatus of claim 12, wherein the at least one user adjusts position to meet the predetermined tracking criterion in response to the audiovisual feedback to the at least one user.

14. The apparatus of claim 11, wherein the capture system comprises an infrared (IR) device.

15. The apparatus of claim 11, wherein the one or more hardware processors receive the filtered tracking points associated with the one or more gestures to generate the one or more gestures.

16. The apparatus of claim 15, wherein the memory stores the generated one or more gestures in a sequence, the sequence based on the requirement of the at least one application.

17. The apparatus of claim 11, wherein the memory stores further instructions that when executed by the one or more hardware processors cause the one or more hardware processors to perform operations comprising: identifying action of the at least one user by gesture event listener.

18. The apparatus of claim 17, wherein the memory stores further instructions that, when executed by the one or more hardware processors cause the one or more hardware processors to perform operations comprising: matching action of the at least one user with the stored one or more gestures to trigger at least one event specific to matched gesture.

19. A non-transitory computer-readable medium that stores programmed instructions for continuous tracking of body of at least one user that, when executed by one or more hardware processors, cause the one or more hardware processors to perform operations comprising:
capturing tracking points on body of the at least one user with a capture system;
listening continuously to at least one application to receive data related to one or more gestures required by the at least one application and body tracking points associated with the one or more gestures;
filtering the tracking points on the body based on the body tracking points associated with the one or more gestures;
monitoring continuously a variation of intensity of the filtered one or more tracking points, the variation of the intensity being associated with tracking of each of the filtered one or more tracking points;
generating an audiovisual feedback in real time for the at least one user when variation of intensity fails to meet a predetermined body tracking criterion, the predetermined body tracking criterion based on tracking of the filtered one or more tracking points; and
confirming the variation of the intensity associated with tracking of each of the filtered one or more tracking points are above a threshold before any tracking of the one or more gestures required by the at least one application.

20. The non-transitory computer-readable medium of claim 19, wherein generating the audiovisual feedback comprises generating a human silhouette of the at least one user.

21. The non-transitory computer-readable medium of claim 20, wherein the at least one user adjusts position to meet the predetermined tracking criterion in response to the audiovisual feedback to the user.

22. The non-transitory computer-readable medium of claim 19, wherein the non-transitory computer-readable medium stores further instructions that, when executed by the one or more hardware processors causes the one or more hardware processors to perform operations comprising: receiving the filtered tracking points associated with the one or more gestures to generate the one or more gestures.

23. The non-transitory computer-readable medium of claim 22, wherein the non-transitory computer-readable medium stores further instructions that, when executed by the one or more hardware processors causes the one or more hardware processors to perform operations comprising: storing the generated one or more gestures in a sequence, the sequence based on the requirement of the at least one application.

* * * * *